UNITED STATES PATENT OFFICE.

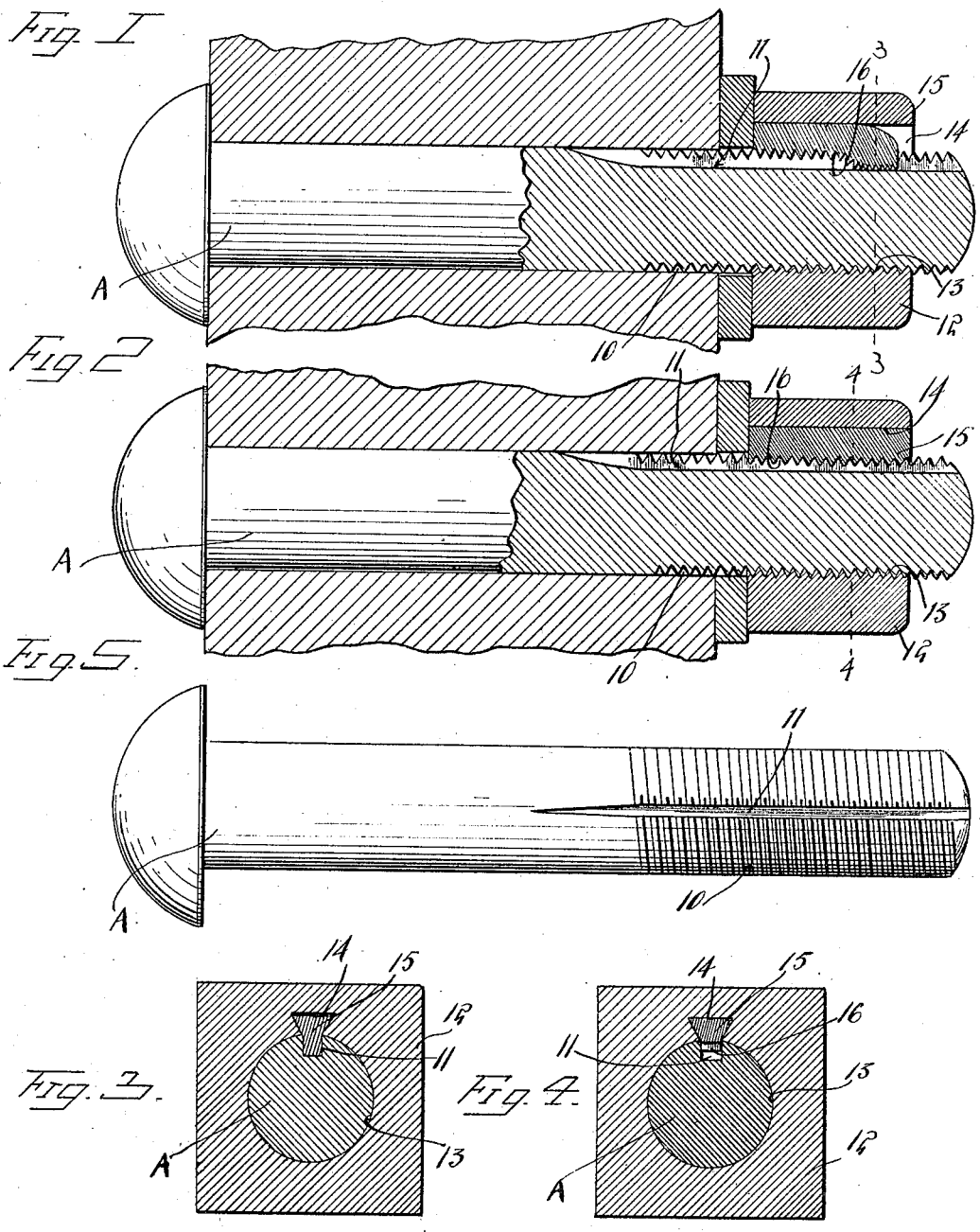

HENRY S. DELAMERE, OF SOUTH BERKELEY, CALIFORNIA.

NUT-LOCK.

1,006,918.  Specification of Letters Patent.  Patented Oct. 24, 1911.

Application filed May 18, 1911. Serial No. 627,912.

*To all whom it may concern:*

Be it known that I, HENRY S. DELAMERE, a citizen of the United States, residing at South Berkeley, in the county of Alameda, State of California, have invented certain new and useful Improvements in Nut-Locks; and I do hereby declare the following to be a full, clear, and exact description of the invention, such as will enable others skilled in the art to which it appertains to make and use the same.

This invention relates to nut locks.

The object of the invention resides in the provision of a simple and inexpensive device of the character named, which can be readily and easily applied and which in use effectually holds a nut from turning off its bolt. The last mentioned term is employed in its generic sense to include equivalent devices, such as rods having threaded ends capable of receiving nuts. The nuts may be of any form, but in the embodiment of the invention herein illustrated and described it is shown as being of the square kind.

With these and other objects in view the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is an elevation partly in section of a bolt and nut embodying the invention. Fig. 2, a view similar to Fig. 1 with the locking device carried by the nut shown inactive. Fig. 3, a section on the line 3—3 of Fig. 1. Fig. 4 a section on the line 4—4 of Fig. 2, and Fig. 5, a plan view of the bolt member looking at the grooved side thereof.

Referring to the drawings A indicates the bolt member of the nut lock which has its shank threaded as at 10. Extending longitudinally of the shank of the bolt and interrupting the threads 10 is a groove 11 for a purpose that will presently appear. The nut member of the lock is indicated at 12 and is provided with a threaded opening 13 whereby said nut may be screwed upon the threaded shank of the bolt A. The wall of the opening 13 is provided with a longitudinal groove 14 which interrupts the threads 13 and has its side wall diverging inwardly. Mounted in the groove 14 is a soft metal insert 15 which has its outer face provided with threads 16 which normally form a continuation of the threads of the opening 13 whereby said insert 15 offers no impediment to the screwing of the nut 12 upon the shank of the bolt A to a desired position.

In order to lock the nut when same has been screwed down to the desired position with the groove 14 in registration with the groove 11 and the insert 15 in the position shown in Fig. 1, it is only necessary to compress the insert 15 longitudinally so as to give a portion of its threads an increased pitch and in addition cause said portion of the insert to flow into the groove 11. This results in the threads of the insert being carried out of registration with the threads of the nut and bolt, so that instead of not interfering in the rotation of the nut on the bolt they interfere. It will be noted however, that when the nut has been locked on the bolt that the former is capable of being unscrewed by the application of sufficient force as the threads of the bolt will cut their own way through the soft metal insert 15.

While the shank of the bolt A has been shown as having a single longitudinal groove it will be noted that a number of these grooves may be employed if desired and likewise instead of having a single soft metal insert carried by the nut, a plurality of same may be included in the structure.

What is claimed is:

The combination with a threaded bolt having a longitudinal groove intersecting its threads, of a nut having a longitudinal groove intersecting its threads and a metal insert filling the groove of the nut and provided with threads having the same pitch and registering with the threads of the nut, the insert being of ductile metal which under the influence of end pressure will be compressed longitudinally so as to reduce its length sufficiently to increase the pitch of a portion of its threads and thereby carry them out of registration with corresponding threads of the nut.

In testimony whereof, I affix my signature, in presence of two witnesses.

HENRY S. DELAMERE.

Witnesses:
A. K. FARNWORTH,
H. G. GUNNING.

Copies of this patent may be obtained for five cents each, by addressing the "Commissioner of Patents, Washington, D. C."